Patented Jan. 7, 1930

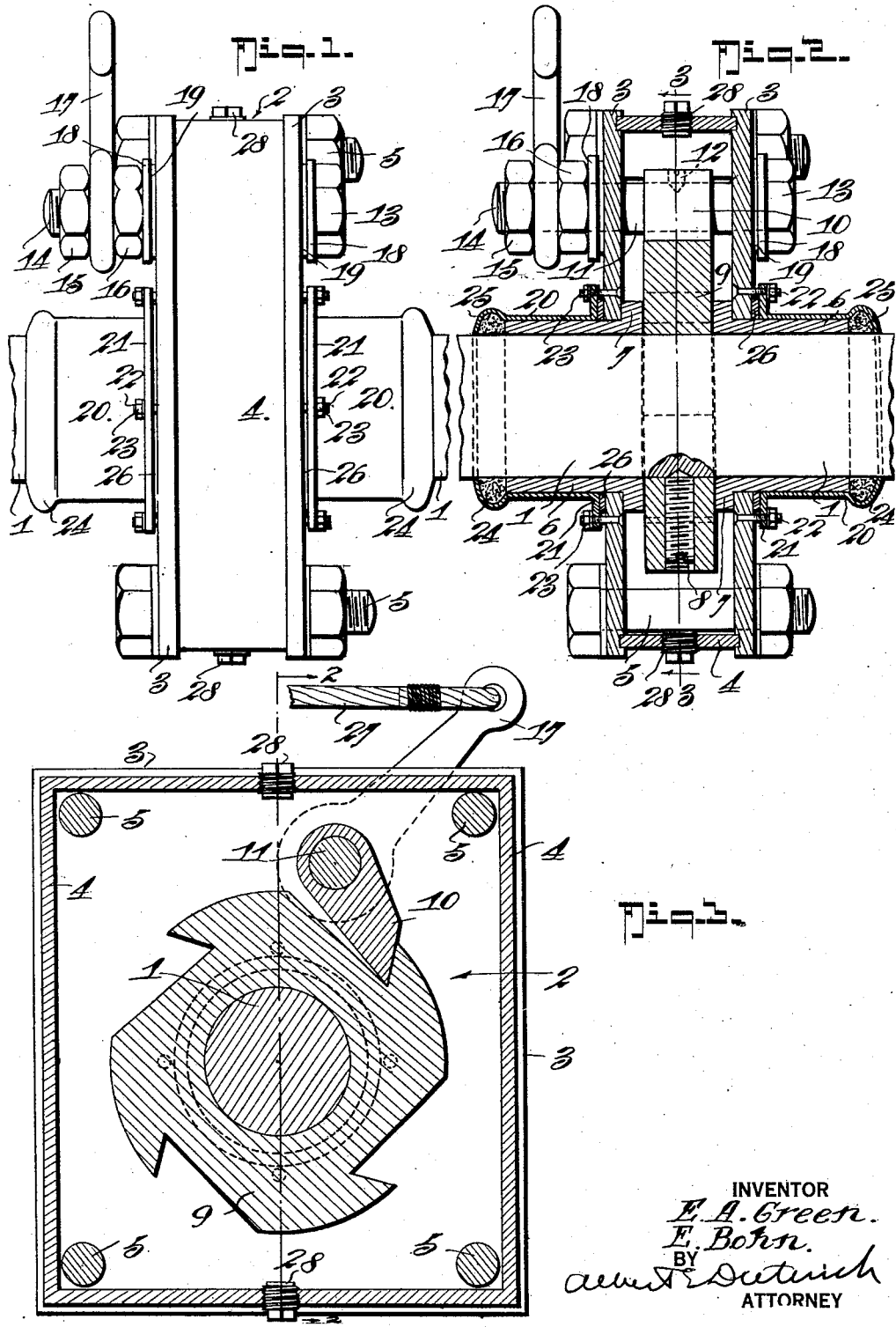

1,742,591

UNITED STATES PATENT OFFICE

EMORY A. GREEN AND EDWARD J. BOHN, OF SANTA ROSA, CALIFORNIA

SAFETY STOP OR BRAKE

Application filed August 16, 1927. Serial No. 213,392.

Our invention relates to means for holding shafts from turning backwardly until desired by an operator and it particularly has for its object to provide a mechanism of general use but which has been particularly designed and adapted for use on the driving or propelling shafts of automotive vehicles to hold the vehicles on up-grades against backing down when the driving power has been cut off.

Further, the invention has for its object to provide an apparatus for the aforesaid purposes, with means for maintaining the parts well lubricated.

Again, it is an object to provide means for preventing entry of dust and dirt into the housing for the working parts and to retain the lubricant in the same.

Further, it is an object to provide a hold-back device that can be placed at any position along the driving or propeller shaft from clutch to differential, as may be found most convenient.

Other objects will in part be obvious and in part be hereinafter referred to.

To the attainment of the aforesaid objects and ends, the invention resides in those novel combinations, constructions and arrangements of parts which will be hereinafter described and pointed out in the claims.

In the drawing, which illustrates a preferred embodiment of our invention,

Figure 1 is a side elevation of a portion of a driving shaft with the invention applied.

Figure 2 is a vertical cross section on the line 2—2 of Figure 3.

Figure 3 is a vertical longitudinal section on the line 3—3 of Figure 2.

In the drawing, in which like numerals of reference indicate like parts in all of the figures, 1 represents the driving or propelling shaft, 2 the housing, which is preferably composed of front and back plates 3—3 and an annular plate 4 held between the front and back plates 3—3 by means of bolts and nuts 5, the joints between the plates 3 and 4 being such as to be fluid-tight.

Each plate 3 is drilled to receive a bearing bushing 6 having a flange 7 at its inner end. Mounted on and secured to the shaft 1 in any suitable way as, for instance, by a set screw 8, is a ratchet 9 with which cooperates a pawl 10 mounted on a pawl shaft 11 that is journalled in bearing apertures in the plates 3 above the plane of the shaft 1. The pawl 10 is secured to the shaft 11 in any suitable way as by a set screw 12. The shaft 11 is in the nature of a bolt having the head 13 and the threaded end 14, on which end 14 the nuts 15 and 16 and releasing lever 17 are mounted. Interposed between the nut 16 and the plate 3 and between the head 13 and the plate 3 are metallic washers 18 and felt or other suitable packing washers 19 so designed that by taking up on the nuts 15 and 16 oil leakage around the shaft 11, where it passes through the plate 10, is prevented.

It should be understood that the housing 2 is so mounted as not to turn. Any kind of brackets or mounting means for the purpose may be employed and as such form, per se, is no part of our invention it is thought illustration thereof is unnecessary.

In order to prevent oil leakage around the bushings 6, where they pass through the housing plates 3, and to prevent oil leakage around the shaft 1, where it passes through the bushings, we provide a cap 20 having a flange 21 adapted to be secured to the housing plates 3 by means of studs or bolts 22 and nuts 23. The cap 20 has a chambered end 24 in which is a suitable packing material 25. Also, there is placed a packing ring 26 between each flange 21 and the adjacent wall 3 of the housing. The packing 25 and 26 is tightened by taking up on the nuts 23 so that oil leakage is thus prevented.

27 is a pull cable attached to the lever 17 and having its other end located at a place conveniently reached by the operator so that by pulling on the cable 27 the pawl 10 may be released from the ratchet 9 and the shaft 1 be left free to turn in either direction, it being understood that normally when the tension on the cable 27 is released gravity acts to locate the pawl 10 in connection with the ratchet 9, the weight of the pawl being assisted by the weight of the lever 17.

Of course, the pawl is always free from holding engagement with the ratchet when the shaft 1 is turning forwardly so as not to interfere with the normal running of the vehicle in a forward direction. When, however, the vehicle stops the pawl will hold the ratchet and thereby the shaft 1 against turning backwardly unless the pawl is first released by a pull on the cable 27.

The housing 2 may be filled and drained through plugged aperatures 28 located at suitable places top and bottom of the housing, it being preferable to keep a sufficient supply of lubricating oil within the housing 2 to at least submerge the lower portion of the ratchet, although the housing may be substantially filled with lubricant, if desired. a heavy steam cylinder oil being preferably used.

From the foregoing description, taken in connection with the accompanying drawing, it is thought the construction, operation and advantages of our invention will be clear to those skilled in the art to which it relates.

What we claim is:

1. In combination with a rotatable shaft, a housing having bearings to fit on said shaft, a ratchet on said shaft within said housing, a pawl shaft mounted in bearings in said housing and extending through the same, a pawl secured on said pawl shaft and gravity operable to engage said ratchet within said housing, and means to withdraw said pawl from engagement with said ratchet.

2. A means to hold a shaft against turning backwardy, said means comprising a housing, removable bearing bushings held in the walls of said housing and through which said shaft passes, a ratchet secured on said shaft and located in said housing between the opposite ends of said bushings, a pawl, a pawl shaft, means mounting said pawl on said pawl shaft within said housing, said pawl adapted to gravitate into engagement with said ratchet normally, means outside said housing for releasing said pawl from engagement with said ratchet, and means to seal said housing around said shafts against oil leakage.

3. In devices of the character stated wherein is provided a non-rotatable housing having bearings for a rotatable shaft which carries an element of a braking mechanism and having bearings for an operating shaft which carries a complementary element of a braking mechanism; said housing comprising a circumferential body and two side plates recessed to receive said circumferential body between them, bolts securing said side plates together and to said circumferential body, said side plates having apertures through which said first mentioned shaft projects, bearing elements flanged within the housing and projected through said aperture to the outside thereof, in which said bearing elements said first mentioned shaft turns, means for introducing a lubricant into said housing, and sealing means cooperating with said bearings to restrain the escape of lubricant from said housing.

4. In devices of the character stated wherein is provided a non-rotatable housing having bearings for a rotatable shaft which carries an element of a braking mechanism and having bearings for an operating shaft which carries a complementary element of a braking mechanism; said housing comprising a circumferential body and two side plates recessed to receive said circumferential body between them, bolts securing said side plates together and to said circumferential body, said side plates having apertures through which said first mentioned shaft projects, bearing elements flanged within the housing and projected through said aperture to the outside thereof, in which said bearing elements said first mentioned shaft turns, means for introducing a lubricant into said housing, sealing means cooperating with said bearings to restrain the escape of lubricant from said housing, said sealing means comprising sleeves embracing the outer ends of said bearings and having pockets at their outer ends, packing material in said pockets, said sleeves having flanges at their inner ends, packing disks located between said flanges and said side plates, and means for drawing said flanges and packing disks in sealing contact with said side plates, substantially as shown and described.

EMORY A. GREEN.
EDWARD J. BOHN.